Patented June 23, 1925.

1,543,166

UNITED STATES PATENT OFFICE.

GEORG KÖHRES, OF LEVERKUSEN, NEAR COLOGNE, GERMANY, ASSIGNOR TO FARBEN-FABRIKEN VORM. FRIEDR. BAYER AND CO., OF LEVERKUSEN, NEAR COLOGNE-ON-THE-RHINE, GERMANY.

WOOL DYE OF THE PYRONE SERIES.

No Drawing.   Application filed October 10, 1924.   Serial No. 742,933.

*To all whom it may concern:*

Be it known that I, GEORG KÖHRES, a citizen of Germany, residing at Leverkusen, near Cologne, in the State of Prussia, Germany, have invented new and useful Improvements in Wool Dyes of the Pyrone Series, of which the following is a specification.

The dyes described in British Letters Patent No. 9600/88 obtained from fluorescein chloride by condensing it with aromatic amines, dye the fibre from red to violet to blue shades.

I have found that by the condensation of a fluorescein chloride with vic. meta-xylidine ($CH_3 : NH_2 : CH_3 = 1:2:3$) dyes of an essentially yellower shade result. Basic coloring matters are thus obtained. The sodium salts of their sulfonic acids dye wool very desirable pure scarlet shades of a fastness to light hitherto unknown in this class of dyestuffs. The term "a fluorescein chloride" is used as generic to fluorescein itself and to its derivatives and homologues.

They are, in the shape of the sodium salts of their sulfonic acids, after being dried and pulverized, generally reddish powders soluble in water generally with a red coloration, in concentrated sulfuric acid generally with a scarlet-red coloration. They dye wool generally scarlet-red shades of a very good fastness to light.

In order to illustrate the new process more fully the following example is given, the parts being by weight:—

100 parts of fluorescein chloride together with 28 parts of zinc oxide, 37 parts of zinc chloride and 99 parts of vic. meta-xylidine are heated to 200–210° C. The melt is at first liquid but solidifies gradually. After cooling it is ground and boiled several times with dilute hydrochloric acid. The residue constituting the dyestuff is filtered off with suction, washed with water until neutral and dried.

In order to prepare the sulfonic acid 1 part is dissolved in 5 parts of monohydrate (sulfuric acid 100 per cent) at a low temperature. The sulfonation is finished when a test portion is soluble in a dilute solution of sodium carbonate. The mixture is poured on ice, the dye is filtered off, washed with a common salt solution and dried.

It is, after being dried and pulverized in the shape of its sodium salt, a red powder soluble in concentrated sulfuric acid with a scarlet-red coloration. It dyes wool pure yellowish-red shades fast to light.

It has in a free state most probably the following formula:

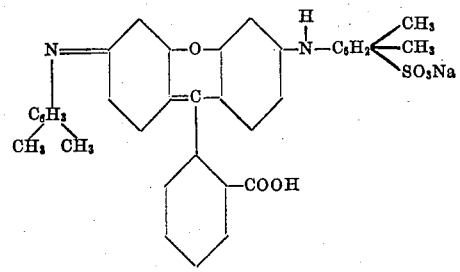

Instead of fluorescein chloride dimethyl-fluorescein chloride can be used. The resulting dye has a still more yellowish shade than that obtained from fluorescein.

I claim:—

1. The process of producing new dyestuffs of the pyrone series, which process consists in condensing a fluorescein chlorid with vic. meta-xylidine ($CH_3 : NH_2 : CH_3 = 1:2:3$) and sulfonating the resulting products, substantially as described.

2. The new dyes of the pyrone series obtainable from a fluorescein chlorid and vic. meta-xylidine which products are in the shape of the sodium salts of their sulfonic acid after being dried and pulverized generally reddish powders soluble in water generally with a red coloration, in concentrated sulfuric acid generally with a scarlet-red coloration, dyeing wool generally scarlet-red shades of a very good fastness to light, substantially as described.

3. The new dye of the pyrone series obtainable from fluorescein chloride and vic. meta-xylidine, which is, after being dried and pulverized in the shape of the sodium salt of its sulfonic acid, a red powder soluble in concentrated sulfuric acid with a scarlet-red coloration having most probably the formula:

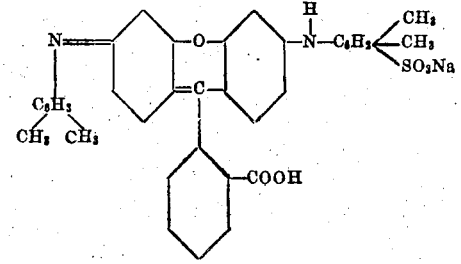

and dyeing wool pure yellowish-red shades fast to light, substantially as described.

In testimony whereof I have hereunto set my hand.

GEORG KÖHRES.